United States Patent

[11] 3,599,185

[72] Inventors Peter G. Bartlett
Davenport, Iowa;
Joseph E. Meschi, Lyons, Ill.
[21] Appl. No. 748,582
[22] Filed July 10, 1968
[45] Patented Aug. 10, 1971
[73] Assignee Gulf & Western Industries
New York, N.Y.

[54] FERROELECTRIC CAPACITOR OUTPUT AMPLIFIER DETECTOR
5 Claims, 5 Drawing Figs.

[52] U.S. Cl. ........ 340/173.2
[51] Int. Cl. ........ G11c 11/22
[50] Field of Search ........ 340/173.2

[56] References Cited

UNITED STATES PATENTS 2,854,590 9/1958 Wolfe ........ 340/173.2
3,015,090 12/1961 Landauer ........ 340/173.2
3,082,409 3/1963 Vogt ........ 340/173.2

*Primary Examiner*—Terrell W. Fears
*Attorney*—Meyer, Tilberry and Body

ABSTRACT: An improvement is provided for two-plate internally polarized nondestructive readout ferroelectric ceramic capacitor, binary memory elements in which one plate serves as the drive plate and the other serves as the memory plate. There is an electrical bit line connection to the memory plate from which a positive or negative voltage is obtained, depending upon the binary information which has been stored in the memory plate. A normally conductive amplifier is provided for normally providing a first signal of the first value and serving to increase the value of the first signal when the bit line output voltage is positive and to decrease the value of the first signal when the bit line voltage is negative. A signal level detector is also provided having first and second outputs responsive to the first signal for energizing the first and second outputs in accordance with whether the value of the first signal is above or below a predetermined value.

INVENTORS.
PETER G. BARTLETT &
JOSEPH E. MESCHI
BY
Meyer, Tilberry & Body
ATTORNEYS INVENTORS.
PETER G. BARTLETT &
JOSEPH E. MESCHI
BY
*Meyer, Tilberry & Body*
ATTORNEYS INVENTORS.
PETER G. BARTLETT &
JOSEPH E. MESCHI
BY
*Meyer, Tilberry & Body*
ATTORNEYS

FERROELECTRIC CAPACITOR OUTPUT AMPLIFIER DETECTOR

This invention relates to the art of ferroelectric storage capacitors and, more particularly, to an output amplifier-detector for use in amplifying binary signals obtained from ferroelectric capacitor matrices. Also, this invention relates to improvements upon the ferroelectric structures disclosed in application, Ser. No. 527,223, filed Feb. 14, 1966, upon which U.S. Pat. No 3,462,746 issued, and application, Ser. No. 640,717, filed May 23, 1967, upon which U.S. Pat. No. 3,401,377 issued, both assigned to the same assignee as the present invention, and which applications are herein incorporated by reference. Further, this invention is directed toward improvements over those disclosed in our previous U.S. Pat. application, Ser. No. 682,814, filed Nov. 14, 1967, entitled Improvements in Ferroelectric Storage Capacitor Matrices, and which is assigned to the same assignee as the present invention.

In recent years, attention has been directed toward utilizing ceramic materials in the computer field. In particular, attention has been directed toward utilizing the electrostrictive piezoelectric and ferroelectric characteristics found in may of these materials. Ferroelectric storage devices, or capacitors, comprise dielectric materials which depend upon internal polarization rather than upon surface charge for storage of information. A number of such materials are known, such as barium titanate, Rochelle salt, lead metaniobiate and lead titanate zirconate composition. These materials may be prepared in the form of single crystals or ceramics, upon which conductive coatings may be applied to provide terminals. Ferroelectric capacitors exhibit two stable states of polarization, somewhat similar to the stable remanence states of magnetic materials, when subjected to electric fields of opposite polarities and, as a consequence, are readily adapted for use as binary storage elements. As storage elements, these materials exhibit characteristics that render them usable over a greater temperature range than that of ferromagnetic cores and, for example, have been found to be usable over a range greater than −55° C. to 125° C. The further characteristic of ferroelectric capacitors is the piezoelectric property, or characteristic, of changing dimensions in response to potentials applied across the terminals of the capacitor and, conversely, of producing a voltage differential between the terminals in response to mechanical pressures exerted between the opposing faces of the capacitor.

U.S. Pat. application. Ser. No. 527,223, discussed hereinbefore, discloses a memory device incorporating ferroelectric capacitors. The memory device disclosed therein includes a pair of substantially flat, ferroelectric capacitor plates, one serving as a drive plate and the other as a memory plate. A layer of conductive material is interposed between the two plates. The plates are secured together in such a manner, as by an electrically conductive bond or by heat fusing, so that the drive plate may transmit mechanical forces to the memory plate in directions acting both laterally and perpendicularly of the plane defined by the memory plate, so as to thereby mechanically stress the memory plate. The drive plate is permanently prepolarized and the memory plate is polarized either negatively or positively by application of an electric potential between its opposing flat surfaces, so that it stores binary information, i.e., polarized negatively or positively. When an interrogating readout voltage is applied between opposing surfaces of the drive plate, its dimensions change in directions extending laterally and perpendicularly of its plane, which forces act to also mechanically stress the memory plate which develops an output signal dependent on its state of polarization. This output signal has a duration substantially that of the applied interrogating readout voltage. If the readout voltage is of a polarity opposite to the direction of polarization of the drive plate, then the magnitude of the interrogating readout voltage is kept well below the polarization threshold voltage, i.e., the voltage required to permanently polarize the drive plate, so that the readout process is nondestructive and can be interrogated indefinitely without need for an automatic rewrite cycle, as is normally required in destructive readout memory devices.

In addition to the single bit memory devices, described above, application, Ser. No. 527,223 also discloses a memory matrix having several word lines, each having associated therewith more than one bit. This memory matrix includes one driver plate for each word line having a plurality of ferroelectric memory plates secured thereto to define a plurality of bits. Similarly, application, Ser. No. 640,717 discloses a memory matrix having several word lines, each having associated therewith more than one bit. In this matrix, however, a single drive plate and a single memory plate are secured together as a monolithic construction, in which several memory bits, are defined. Each bit, for example, is defined in a portion of the memory plate taken between two conductive strips on opposite surfaces of the memory plate.

It is particularly desirous that some means be provided for amplifying the output voltage developed by an interrogated memory bit. Such an amplifier-detector should provide outputs indicative of the stable state of the memory bit. These outputs in turn may be coupled to a register for registering the correct binary state of the memory bit.

The present invention is directed toward satisfying the foregoing needs of detecting the binary state of an interrogated memory bit.

The present invention contemplates the provision of means defining at least one ferroelectric capacitor memory bit having first and second oppositely facing surfaces and adapted to be polarized in one of two stable states by application of an electric field between the surfaces. The memory bit develops, when subjected to the mechanical stress, a direct current output voltage between the surfaces of a polarity indicative of its state of polarization.

In accordance with the present invention, an improvement is provided for detecting whether an output voltage from a memory bit is representative of a first or a second stable state. The improvement comprises: an electrically conductive bit line in electrical contact with the first surface of a memory bit; an electrically conductive common line in electrical contact with the second surface of the memory bit and adapted to be connected to a reference potential; normally conductive amplifier means for normally providing a first signal of a first value and serving to respectively increase and decrease the value of the first signal when the output voltage is respectively positive and negative with respect to the reference potential; and, signal level detector means having first and second outputs and being responsive to the first signal for energizing the first or second outputs in accordance with whether the value of the first signal is above or below a predetermined value.

The primary object of the present invention is to provide apparatus for detecting whether an output voltage obtained form an interrogated memory bit is representative of a first or second stable state of the memory bit.

A still further object of the present invention is to provide apparatus for detecting the binary character of the output voltages obtained form capacitor matrices constructed in accordance with U.S. Pat. applications, Ser. Nos. 527,223 and 640,717.

A still further object of the present invention is to provide register means coupled to the detector means for storing information representative of the binary character of an interrogated memory bit.

A still further object of the present invention is to provide circuitry which is relatively simple for manufacture and economical in use for detecting the binary character of binary outputs of ferroelectric capacitor bits and matrices.

The foregoing and other objects and advantages of the invention will become apparent from the following description of the preferred embodiments of the invention as read in connection with the accompanying drawings in which.

BACKGROUND DISCUSSION

Figure 1:
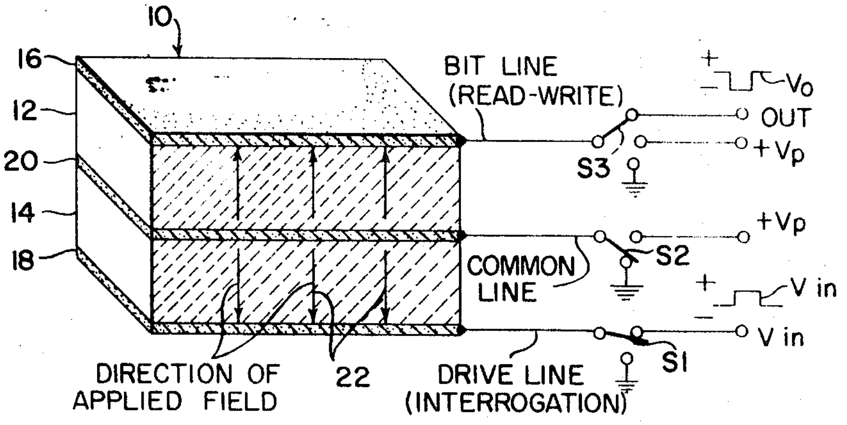
FIG. 1 is a schematic illustration of a ceramic memory single bit construction, illustrating the principles upon which the present invention is based.

Before describing the preferred embodiments of the invention, attention is directed toward the following description of a single bit memory device constructed in accordance with the teachings of U.S. Pat. application, Ser. No. 527,233. As shown in FIG. 1, that structure includes a single bit ceramic memory device 10, which generally comprises a memory plate 12 constructed of ferroelectric material, such as barium titanate, Rochelle salt, lead metaniobiate or lead titanate zirconate composition, for example. In its preferred form, however, memory plate 12 is constructed of lead titanate zirconate composition since it is easy to polarize. Drive plate 14 is preferably constructed of ferroelectric material having piezoelectric characteristics, such as lead titanate zirconate composition. However, the drive plate may be constructed of any material that will change its dimensions upon application of an electric signal, such as, for example, magnetostrictive material which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of the plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12 so as to mechanically stress plate 12 in directions acting both laterally and perpendicularly of its plane.

Drive plate 14 may be permanently polarized by applying an electric field across its opposing flat surfaces. Thus, as shown in FIG. 1, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage $+V_p$. Plate 14 may be polarized by connecting layer 20 with the $+V_p$ voltage and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIG. 1 for a subsequent readout operation.

Binary information may be stored in memory plate 12 by applying an electric field between the opposing faces of the plate in either one of two directions, so that the plate either a binary "1" or a binary "0" signal. Layer 16 is connected to a single pole switch S3. Switch S3 serves to connect layer 16 with either a ground potential, of a $+V_p$ source of polarizing potential, to an output circuit OUT. When it is desired to store a binary "1" signal in memory plate 12, switches S2 and S3 are manipulated so that $+V_p$ potential is applied to layer 16 and ground potential is applied to layer 20. As shown in FIG. 1, however, memory plate 12 stores a binary "0" signal, which results from having applied $+V_p$ potential to layer 20 and ground potential to layer 16.

With switches S1, S2 and S3 in the positions shown in FIG. 1, an interrogating input voltage $V_{in}$ is applied to layer 18. If the applied voltage $V_{in}$ is of a polarity opposite to the direction of polarization of the drive plate, then the magnitude of this interrogating voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 or conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIG. 1, the output voltage $V_0$ will be a negative pulse representative that a binary "0" signal is stored by plate 12. For a further description of a ceramic memory device as shown in FIG. 1, reference should be made to U.S. Pat. application, Ser. No. 527,233.

CERAMIC MEMORY MATRIX

Figure 2:
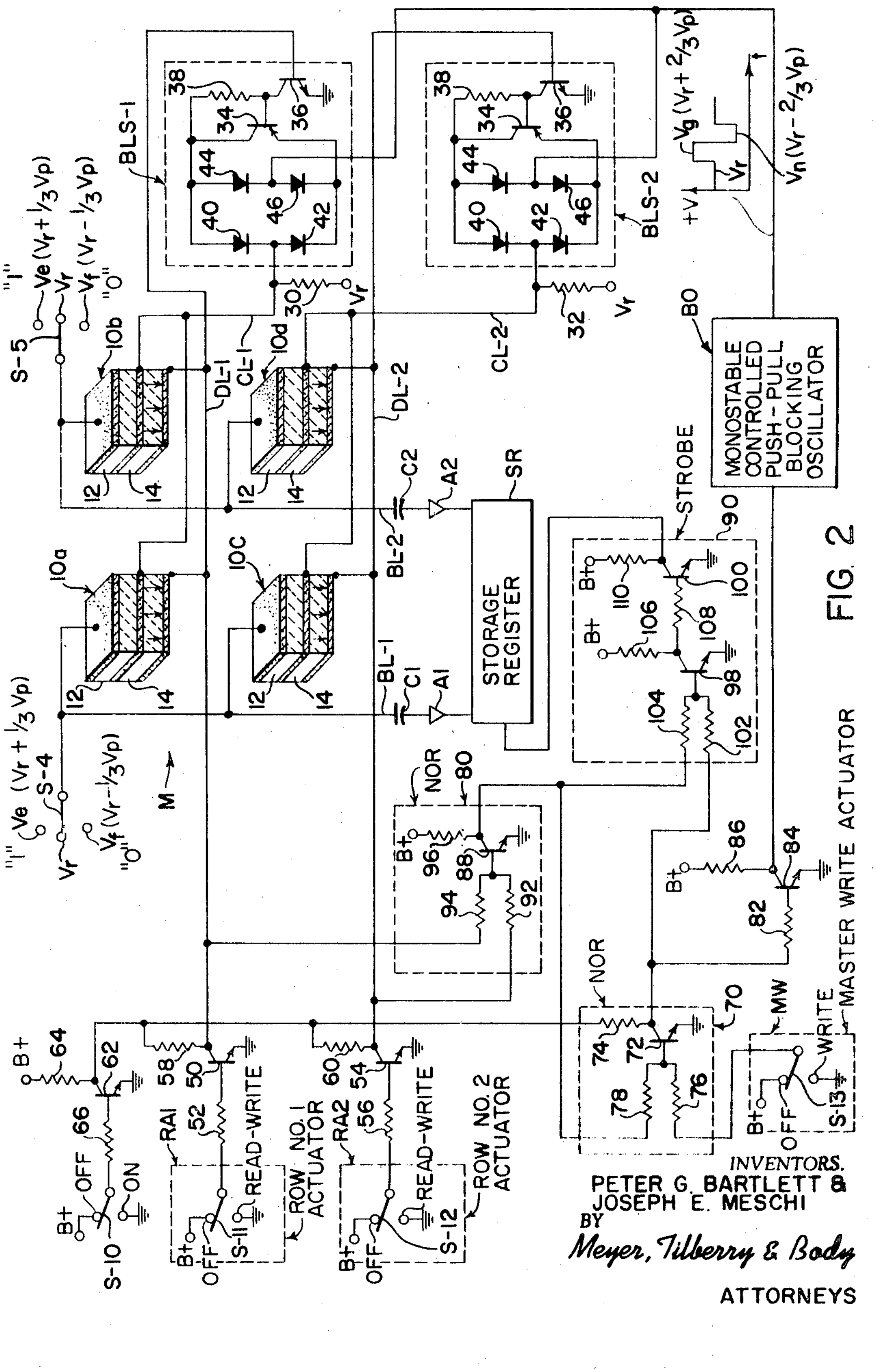
FIG. 2 is a schematic illustration of a ferroelectric capacitor matrix together with circuitry for programming and interrogating the matrix.

Having now described the single bit ceramic memory device, together with the manner in which binary information is stored and interrogated, reference is now made to the ceramic memory matrix M of FIG. 2. For purposes of simplification, this matrix is shown as including only four ceramic memory devices **10*a*, 10*b*, 10*c*, 10*d*, each corresponding with the single bit ceramic memory device 10 illustrated in FIG. 1. These four memory devices are arranged in two vertical columns and two horizontal rows; to wit, a first column includes devices 10*a* and 10*c*, a second column includes devices 10*b* and 10*d*, a first row includes devices 10*a* and 10*b*, and a second row includes devices 10*c* and 10*d*. A common bit line BL–1 is electrically connected to the upper surface of memory plates 12 of the ceramic memory devices 10*a* and 10*c*. A second common bit line BL–2 is electrically connected to the upper surfaces of memory plates 12 of ceramic memory devices 10*b* and 10 *d*. Bit line BL–1 is also connected to a three position switch S–4 for respectively applying to the bit line either an open circuit potential, a first direct current voltage level $V_e$ or a second direct current voltage level $V_f$. Voltage level $V_e$ is equal to a reference potential $V_r+\frac{1}{3}V_p$, where $V_p$ is the value of the polarization potential required to polarize a memory plate 12**. Also, voltage level $V_f$ is equal to $V_r-\frac{1}{3}V_p$. Similarly, bit line BL–2 is also connected to a three position switch S–5 for selectively connecting bit line BL–2 with either an open circuit potential or direct current voltage level $V_e$ or direct current voltage $V_f$. Accordingly, if the reference voltage is 104 volts and the polarization voltage is 120 volts, then voltage level $V_e$ is equal to 144 volts and voltage level $V_f$ is equal to 64 volts.

A common line CL–1 is electrically connected to the lower surface of memory plates 12 in the ceramic memory devices **10*a* and 10*b*. Similarly, a common line CL–2 is electrically connected to the lower surfaces of memory plates 12 in memory devices 10*c* and 10*d*. Resistors 30 and 32** are respectively connected between ground and common lines CL–1 and CL–2.

Common lines CL–1 and CL–2 are respectively coupled to bilevel switch circuits BLS–1 and BLS–2. These circuits are identical and each includes a NPN transistor 34, an NPN transistor 36, a resistor 38 and four diodes 40, 42, 44 and 46. Diodes 40 and 41 are connected together in series across the collector to emitter circuit of transistor 34. The junction between diodes 40 and 42 is connected to the common line CL–1 for circuit BLS–1, or the common line CL–2 for circuit BLS–2. Also, diodes 44 and 46 are connected together in series across the collector or emitter circuit of transistor 34. The junctions of diodes 44 and 46 in both circuits BLS–1 and BLS–2 are coupled to the output of a monostable controlled push-pull oscillator BO. Resistor 38 is connected across the base to collector circuit of transistor 34 and hence to the collector of transistor 36. The emitter of transistor 36 is connected to ground.

The output of the blocking oscillator BO, in the description of operation to be given in detail hereinafter, is a positive voltage and incorporates two voltage levels with respect to reference voltage $V_r$. These levels include voltage level $V_g$ and voltage level $V_h$, as shown by the graph of voltage versus time in FIG. 3. Voltage level $V_g$ may, for example, be equal to voltage level $V_r$ plus two thirds of he value of polarization potential $V_p$. Similarly, voltage level $V_h$ may be equal to the voltage level $V_r$ less two-thirds of the value of polarization potential $V_p$. Thus for example, if the polarization potential is 120 volts, and the value of this potential is dependent upon the thickness of a memory plate 12 as well as the type of material employed, then with a reference voltage $V_r$ equal to 104 volts, it is seen that voltage level $V_g$ is 184 volts and voltage $V_h$ is 24 volts.

Common line CL–1 is also electrically connected to the upper surfaces of driver plates 14 of memory devices 10*a* and 10*d*, by means of the electrically conductive epoxy 20 between plates 12 and 14. Similarly, common line CL–2 is electrically connected to the upper surfaces of driver plates 14 of memory devices 10*c* and 10*d*. A drive line DL–1 is electrically connected to the lower surfaces of driver plates 14 of memory devices 10*a* and 10*b*, as well as to the base of transistor 36 in the bilevel switch circuit BSL–1.

Bit line BL–1 is coupled through a series circuit including capacitor C1 and bit line amplifier A1 to a storage register SR. Similarly, bit line BL–2 is coupled through a series circuit including capacitor C2 and bit line amplifier A2 to the storage register SR. The storage register SR may take any suitable form, such as a temporary storage register.

In FIG. 2, a pair of row actuators RA1 and RA2 are provided for respectively actuating row NO. 1, i.e., the row which includes memory devices 10*a* 10*b*, and row No. 2, i.e., the row that includes memory devices 10*c* and 10*d*. Actuator RA1 includes a two position switch S–11 for connecting the base of an NPN transistor 50 with either B+ potential (off position) or ground potential (read-write position). Switch S–11 is coupled to the base of transistor 50 through a suitable resistor 52. The collector of transistor 50 is connected directly with drive line DL–1. Similarly, actuator RA2 includes a two position switch S–12 which is coupled to the base of an NPN transistor 54 through a resistor 56. The collector of transistor 54 is directly connected with drive line DL–2.

the collectors of transistors 50 and 54 are respectively connected through resistors 58 and 60 to the collector of an NPN transistor 62. Transistor 62 has its emitter connected to ground and its collector connected through a resistor 64 to a B+ voltage supply source. Also, the base of transistor 62 is coupled through a resistor 66 to a two position switch S–10. Switch S–10 serves to connect resistor 66 with either a B+ potential (off position) or with ground potential (on position).

A master write actuator circuit MW is also included in the embodiment of FIG. 2, and includes a two position switch S–13 for connecting one input of a NOR circuit 70 with either a ground potential (write position) or B+ potential (off position). NOR circuit 70 is an RTL NOR circuit and includes an NPN transistor 72 having its emitter connected to ground and its collector connected through a resistor 74 to the collector of transistor 64. The base of transistor 72 is connected through a resistor 76 to the switch S–13 in master write actuator circuit MW. A second input to the base of transistor 72 is taken through a resistor 78 from the output circuit of another NOR circuit 80. The output of NOR circuit 70 is taken at the collector of transistor 72 and is applied to the input of a strobe circuit 90 as well as through a resistor 82 to the base of an NPN transistor 84. Transistor 84 has its emitter connected to ground and its collector connected through a resistor 86 to a B+ voltage supply source. Also, the collector of transistor 84 is connected through a resistor 86 to a B+ voltage supply source. Also, the collector of transistor 84 is connected to the input of blocking oscillator BO.

NOR circuit 80 is identical to NOR circuit 70 and includes an NPN transistor 88, a pair of input resistors 92 and 94 which are coupled to the base of the transistor. More particularly, resistor 94 connects the collector of transistor 50 with the base of transistor 88 and resistor 92 connects the collector for transistor 54 with the base of transistor 88. The collector of transistor 88 is connected through a resistor 96 to a B+ voltage supply source. The output of NOR circuit 80 is taken at the collector of transistor 88 and is connected both to one input, at resistor 74, of NOR circuit 70, as well as to one input of strobe circuit 90.

Strobe circuit 90 includes a pair of NPN transistors 98 and 100. Transistors 98 is connected in a NOR circuit configuration with one input to its base being taken through a resistor 102 form the collector of transistor 72. The other input to he base of transistor 98 is taken through a resistor 104 from the collector of transistor 88. The collector of transistor 98 is connected through a resistor 106 to a B+ voltage supply source. Transistor 100 has its base connected through a resistor 108 to the collector of transistor 98 and its emitter connected to ground. Also, transistor 100 has its collector connected through a resistor 100 to a B+ voltage supply source. The output of strobe circuit 90 is taken at the collector of transistor 100 and is connected to the storage register SR.

BLOCKING OSCILLATOR

Figure 3:
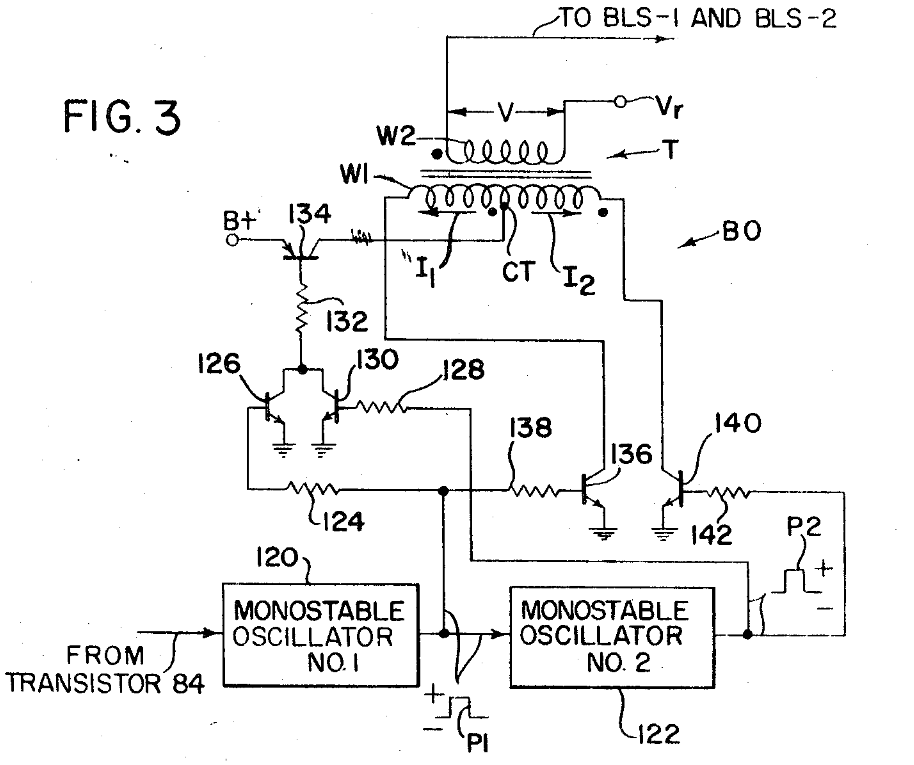
FIG. 3 is a schematic illustration of a monostable controlled push-pull blocking oscillator used in conjunction with the matrix in FIG. 2.

The preferred form of blocking oscillator BO is shown in FIG. 3, and it includes a pair of series connected monostable oscillators 120 and 122. The input for oscillator 120 is taken from the collector of transistor 84 and the output of oscillator 120 is applied to the input of oscillator 122. The output of oscillator 120 is also connected through a resistor 124 of the base of an NPN transistor 126 having its emitter connected to ground. Similarly, the output of oscillator 122 is connected through a resistor 128 to the base of an NPN transistor 130 having its emitter connected to ground, The collectors of transistor 126 and 130 are connected together in command and thence through a resistor 132 to the base of a PNP transistor 134 having its emitter connected to a B+ voltage supply source. The collector of transistor 134 is connected to a center tap CT on a primary winding W1 of a transformer T. The left end of primary winding W1 is having to the collector of NPN transistor 136 having its emitter connected to ground and its base connected through a resistor 138 to the output of oscillator 120. Similarly, the right end of winding W1 is connected to the collector of an NPN transistor 140 having its emitter connected to ground and its base connected through a resistor 142 to the output of oscillator 122. The secondary winding W2 of transistor T has its right end connected to the reference voltage source $V_r$ and its left end connected in common to all of the bilevel switch circuits BLS–1 and BLS–2 (see FIG. 3). The transformer windings are connected in accordance with the polarity of the black dots shown in FIG. 3.

The operation of oscillator BO commences when transistor 84 (see FIG. 2) is biased into conduction. As transistor 84 is biased into conduction, a negative going signal is applied from the collector of transistor 84 to oscillator 120. Oscillator 120 is a typical monostable oscillator and, as is well known, serves upon receipt of a negative going signal to provide a positive output pulse P1 (see FIG. 3) of a given magnitude and given duration. Pulse P1 is applied to the base of transistor 126 as well as the input circuit of monostable oscillator 122. Monostable oscillator 122 does not provide an output pulse P2 until it receives the trailing or negative going edge of pulse P1. In the meantime, pulse P1 serves to forward bias transistor 126 which, in turn, forward biases transistor 134. Accordingly, essentially B+ potential is applied to the center tap CT of winding W1. Pulse P1 also serves to bias transistor 136 into conduction so that essentially ground potential is applied to the left end of winding W1. Thus, for the duration of pulse P1 current flows form the center tap CT through the left half of winding W1 to ground, in accordance with the direction of arrow I1. A voltage V is induced in secondary winding W2 of a polarity in accordance with the black dots shown in FIG. 5. Thus, voltage V adds to voltage $V_r$. The magnitude of voltage V is on the order of $\frac{2}{3}V_p$, as determined by such factors as the transformer winding ratio.

On the negative going, or trailing, edge of pulse P1, monostable oscillator 122 is actuated to provide output pulse P2. This pulse forward biases transistors 130 and 140. Also, since transistor 130 is now biased into conduction, transistor 134 becomes conductive to apply essentially B+ potential to the center tap CT. Since transistor 140 is also forward biased it essentially applies ground potential to the right end of winding W1. Accordingly, current flows, during the duration of pulse P2, through the right half of winding W1 in accordance with the direction of arrow I2. The induced voltage V in the secondary winding W2 will subtract from the reference voltage $V_r$. From the foregoing discussion, it is seen that each time transistor 84 is biased into conduction a train of two pulses $V_g$ and $V_h$ (see FIG. 2) are applied to all of the bilevel switch circuits BLS–1 and BLS–2.

OPERATION

If it is desired to store a binary "1" signal in a memory plate 12, then the upper surface of that memory plate should be connected to voltage level $V_e$. If, however, a binary "0" signal is to be stored, the upper surface of a memory plate 12 must be connected with voltage level $V_f$. As will be discussed hereinafter, voltage levels $V_g$ and $V_h$ are applied at different times to the lower surfaces of memory plates 12. If the potential on the upper surface of a memory plate is $V_e$ and the potential on the lower surface is $V_g$, then the potential difference is $-\frac{1}{3}V_p$, which is not sufficient to polarize the memory plate. However, if the potential on the lower surface is $V_h$ then the potential difference is $+V_p$, which positively polarizes the memory plate to store a binary "1" signal. Similarly, if the potential on the upper surface of a memory plate 12 is $V_f$ and the potential on the lower surface is $V_h$, then the voltage difference is $-\frac{1}{3}V_p$, which is insufficient to polarize the memory plate. However, if the potential on the lower surface of that memory plate is $V_g$, then the potential difference is $-V_p$ which serves to negatively polarize that memory plate to store a binary "0" signal.

Application of binary information to be stored in matrix M is accomplished one row at a time. First, switches S–4 and S–5 are manipulated, as desired, for storage of either binary "1" or binary "0" signals. Then, switch S–10 is manipulated to its "on" position so that transistor 62 is reversed biased. This applies essentially B+ potential to the collectors of transistors 50, 54 and 74. During the write operation of row No. 1, the next step is to manipulate switch S–11 from its "off" position to its "read-write" position. This reverse biases transistor 50 so that the positive potential at its collector is applied as an actuating signal to forward bias transistor 36 in bilevel switch circuit BLS–1. After switch S–11 has been manipulated to its "read-write" position, the operator then manipulates switch S–13 in the master write actuator circuit MW to its "write" position. Since the potential on the collector of transistor 50 is essentially at B+ potential and the potential on the collector of transistor 54 is essentially at ground potential, transistor 88 in NOR circuit 80 is biased into conduction. Accordingly, the potential on the collector of transistor 88 is essentially at ground and this potential is applied through resistor 78 in NOR circuit 70 to the base of transistor 72. Since switch S–13 now applied a ground signal through resistor 76 in the base of transistor 72, this transistor is reversed biased and its collector applies essentially a B+ potential to the base of transistor 84. Accordingly, transistor 84 is biased into conduction to energize oscillator BO. The output circuit of blocking oscillator BO carries a train of two voltage pulses respectively of voltage levels $V_g$ and $V_h$. These voltage levels are applied at different times to the bilevel switch BLS–1, which has been actuated into conduction due to the positioning of switch S–11 to the "read-write" position. Accordingly, memory devices 10a and 10b now become polarized to store binary signals in accordance with positioning of switches S–4 and S–5.

After row No 1 has been written as discussed above, switch S–11 is returned to its "off" position and switch S–13 is returned to its "off" position. The circuitry is now in condition for applying binary signals to row No. 2. The same steps discussed above are repeated for This operation.

When it is desired to interrogate one of the rows, the associated row actuator switch S–11 or S–12 is manipulated to its "read-write" position. However, during operation, the master write actuator switch S–13 is left in its "off" position. During the interrogation of row No. 1, switch S–11 is manipulated to its "read-write" position. This reverse biases transistor 50 so that its collector applies essentially a B+ potential to drive line DL–1. Thus, the voltage difference between the upper and lower surfaces of memory plates 14 in row No. 1 is changed by the value of the B+ potential. This potential corresponds with interrogation voltage $V_{in}$, discussed previously with respect to FIG. 1. The output voltages of memory devices 10a and 10b appear on bit lines BL–1 and BL–2 in accordance with the polarities of the stored binary signals. These output voltages are applied through capacitors C1 and C2 and amplifiers A1 and A2 to storage register SR. The register is strobed by strobe circuit 90 so that it is gated into conduction to receive these output signals form memory devices 10a and 10b only during the time that the matrix M is being interrogated. The gating signal to the storage register SR takes the form of a negative going signal. During interrogation operation of row No. 1, the potential at the collector of transistor 88 of NOR circuit 80 is essentially at ground potential. Since the master write actuator switch S–13 is in its "off" position, the output taken at the collector of transistor 72 of NOR circuit 70 is essentially at ground potential. Accordingly, transistor 98 in strobe circuit 90 is reversed biased so that essentially a B+ forward biasing potential is applied to the base of transistor 100. This causes the potential on the collector of transistor 100 to decrease in a negative direction so that the storage register SR is gated to receive the binary signals from ceramic memory devices 10a and 10b. The same procedure as discussed above with reference to interrogating row No. 1 is repeated when interrogating row No. 2.

MEMORY BIT AMPLIFIER-DETECTOR

Figure 4:
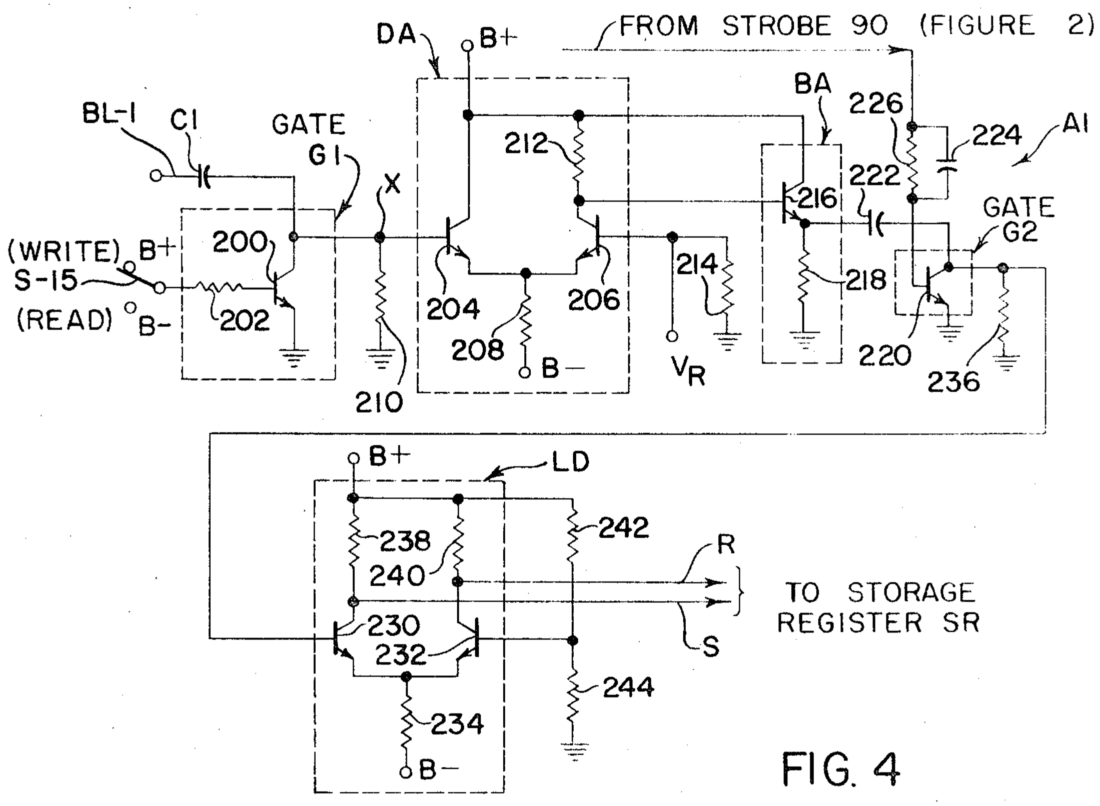
FIG. 4 is a schematic illustration of the amplifier-detector circuitry of the present invention; and, FIG. 5 is a schematic illustration of the register circuitry of the present invention.

In accordance with the present invention, amplifiers A1 and A2 are respectively connected with bit lines BL–1 and BL–2, and serve to amplify the bit output voltages as well as to detect whether these voltages are representative of binary "1" or binary "0" signals of the interrogated memory bits. Amplifier A1, which is constructed in the same manner as amplifier A2, is shown in FIG. 4, and generally comprises: a gate G1 coupled to bit line BL–1 through capacitor C1; a normally conductive class A differential amplifier DA coupled to gate G1; a normally conductive buffer amplifier BA coupled to the output of differential amplifier DA; a gate G2; and, a signal level detector LD.

Gate G1 includes an NPN transistor 200 having its collector connected to capacitor C1 and its emitter connected to ground. The base of transistor 200 is coupled through a resistor 202 to a two position switch S–15. It is to be appreciated that switch S–15 may take various forms, such as solid state circuitry, but, for purposes of a simplified explanation of the invention, it is shown herein as a simple switch. Normally, switch S–15 is connected to a source of B+ voltage during the write functions of the circuitry shown in FIG. 2. During the interrogation, or read function, however, switch S–15 is coupled to the B– voltage source for reverse biasing transistor 200. In this way, the output signals on bit line BL–1 are normally passed to ground by transistor 200 except when this transistor is reversed biased during an interrogation or read operation.

Differential amplifier DA is a class A amplifier and includes a pair of NPN transistors 204 and 206 having their emitters connected together in common, and thence through a resistor 208 to the B– voltage supply source. The base of transistor 204 is coupled to the collector of transistor 200 in gate G1. A resistor 210 is connected between ground and the junction of transistors 200 and 204. The collector of transistor 204 is directly connected to a B+ voltage supply source. Similarly, the collector of transistor 206 is connected through a resistor 212 to the B+ voltage supply source. The base of transistor 206 is connected to a resistor 214 to ground, as well as to the reference source VR.

The normally conductive buffer amplifier BA includes an NPN transistor 216 having its collector connnected to the B+ voltage supply source and its base connected to the collector of transistor 206 in the differential amplifier DA. The emitter of transistor 216 is coupled through a resistor 218 to ground.

Gate G2 includes an NPN transistor 220 having its emitter connected to the ground and its collector coupled through a capacitor 222 to the emitter of transistor 216. The base of transistor 220 is coupled through a parallel circuit including capacitor 224 and resistor 226 to the collector of transistor 100 in strobe circuit 90.

The signal level detector LD includes a pair of NPN transistors 230 and 232 having their emitters connected together in common and thence through a resistor 234 to a B– voltage supply source. The base of transistor 230 is coupled to the collector of transistor 220 in gate G2. A resistor 236 is connected between ground and the common connection between transistors 220 and 230. The collector of transistor 230 is coupled through a resistor 238 to the B+ voltage supply source. Similarly, the collector of transistor 232 is coupled through a resistor 240 to the B+ voltage supply source. A voltage divider, including resistors 242 and 244, is connected between the B+ voltage supply source and ground. The junction of resistors 242 and 244 is connected to the base of transistor 232. Signal level detector LD has two outputs; to wit, a set output S and a reset output R respectively coupled to the collectors of transistors 230 and 232.

STORAGE REGISTER

Figure 5:
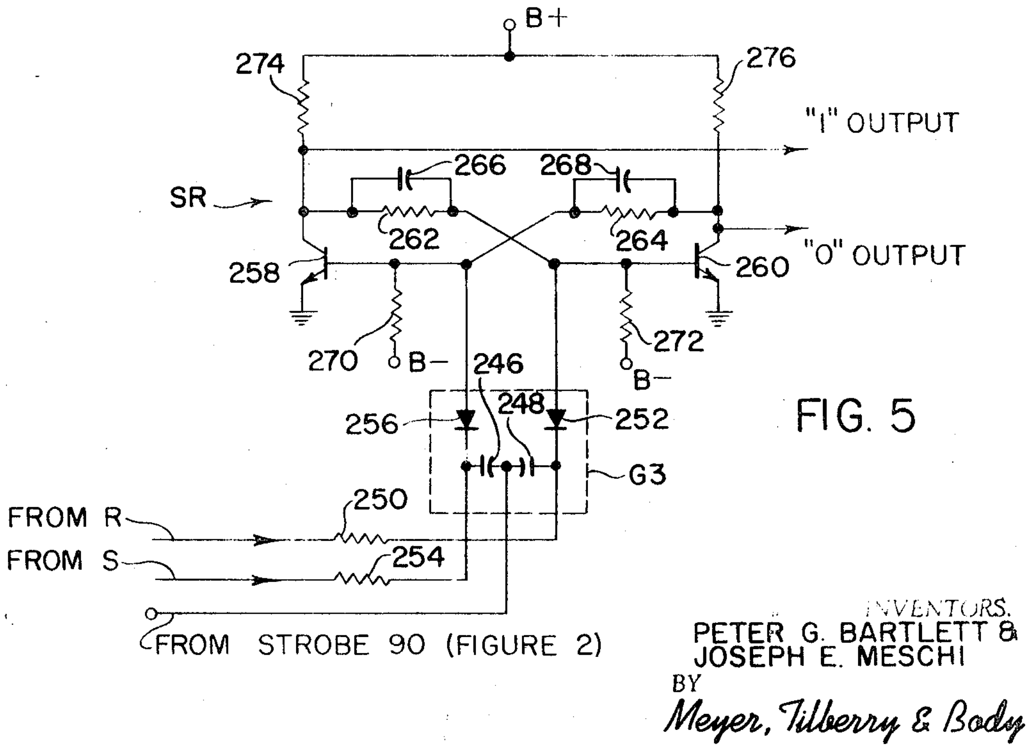

Further in accordance with the invention, amplifier A1 is coupled to a storage register SR, which includes for each bit line the circuitry illustrated in FIG. 5. As shown there, the circuitry has three inputs taken from reset output R and set output S of the circuitry illustrated in FIG. 4, and also from the strobe 90 shown in FIG. 2. These three inputs are applied to a pulse steering gate G3 which includes a pair of series connected capacitors 246 and 248. The junction of these two capacitors is coupled to the strobe circuit 90 of FIG. 2. The input from the reset output R is applied through resistor 250 to the junction of capacitor 248 and a diode 252, poled as shown, Similarly, the input taken from set output S is applied through resistor 254 to the junction of capacitor 246 and a diode 256, poled as shown.

Register SR also includes a pair of NPN transistors 258 and 260, each having their emitters connected to ground. The base of transistor 258 is coupled to diode 256 and the base of transistor 260 is coupled to diode 252. The collector of transistor 258 is connected through a resistor 262 to the base of transistor 260. Similarly, the collector of transistor 260 coupled through a resistor 258. Capacitors 266 and 268 are respectively connected in parallel with resistors 262 and 264. The base of transistor 258 is also coupled through a resistor 270 to a B– voltage supply a Similarly, the base of transistor 260 is connected through a resistor 272 to a B– voltage supply source. The collector of transistor 258 is also connected through a resistor 274 to a B+ voltage supply source. Also, the collector of transistor 260 is connected through a resistor 276 to the B+ voltage supply source. The circuitry described defines a bistable multivibrator circuit. The binary "1" output and binary "0" output are taken respectively from the collectors of transistors 258 and 260.

OPERATION

During write operation, switch S–15 serves to apply a forward biasing signal to transistor 200 so as to thereby maintain point X at substantially ground potential. This is done to prevent write signals that are applied to the bit line during a write operation from being coupled to the memory output amplifier detector circuit. This detector circuit normally serves during a read operation to receive a signal in the millivolt range, but a write signal could be on the order of several volts which might tend to damage the amplifier detector circuitry. Accordingly, then, point X is placed at ground potential during the write operation.

During an interrogation or read operation, switch S–15 is manipulated to reverse bias transistor 200 so that an output voltage on bit line BL–1 may be coupled to the detector circuitry. If the input voltage at point X is a negative signal, i.e., representative of a binary "0" signal, transistor 204 will decrease in conductivity, whereby transistor 206 will increase in conductivity. Thus, transistor 216 in buffer amplifier BA will become slightly less conductive and, hence, a relatively small positive voltage will appear across load resistor 218. Normally, this voltage is not applied to the signal level detector LD since transistor 220 is normally biased into conduction. However, whenever transistor 100 in strobe circuit 90 is biased into conduction, a negative going signal will appear on its collector and this serves to reverse bias transistor 220 in gate G2 permitting the output voltage across resistor 218 to be applied to the signal level detector LD.

It is to be appreciated that the bit line voltage at point X is a positive going signal, i.e., representative of a binary "1" signal, transistor 204 would increase in conductivity and hence transistor 206 would decrease in conductivity. This would cause resistor 216 to increase in conductivity to obtain a larger voltage across resistor 218.

The signal level detector LD serves to determine whether the voltage at point X represents a binary "1" signal or a binary "0" signal, i.e., a large positive signal across resistor 218 or a small positive signal across resistor 218, with respect to the value of the voltage across this resistor during the normal operation of the buffer amplifier. This signal is in the millivolt range and, with the components used during a test, it was found that the threshold potential for the level detector is on the order of 200 millivolts. A binary "0" signal is represented by a voltage below 200 millivolts and a binary "1" signal is represented by a voltage above 200 millivolts. Accordingly, then, if the signal obtained from resistor 218 is below 200 millivolts, transistor 230 will turn off whereupon its collector potential will be substantially that of the B+ potential. In such case, substantially B+ potential will appear on the set output S. At the same time, transistor 232 will become fully conductive and its collector potential, i.e., the reset output R, would be somewhere near ground potential.

If, on the other hand, a positive signal is applied at point X the voltage developed across resistor 218 will be above the threshold potential. Therefore, transistor 230 will become conductive and transistor 232 will become nonconductive.

Hence, the reset output R will be substantially at B+ potential, and the set output S will be somewhere near ground potential. These signals are then applied to the register circuitry of FIG. 5.

In the operation of the registry circuit of FIG. 5, it may be assumed that the output taken from the detector amplifier is indicative of a binary "1" signal from the interrogated memory bit. In such case, a positive potential is present on the reset input R and a potential approaching ground potential is on the set input S. Normally, the strobe line carries a B+ signal to the junction of capacitors 246 and 248. However, once the strobe circuit is triggered so that transistor 100 goes into conduction, a negative going signal or pulse is applied to he junction of these two capacitors. Since a ground potential is on the set line S this negative pulse is seen at the base of transistor 258 so that this transistor becomes reversed biased. Hence, the collector potential of transistor 258 is essentially at B+ potential and this appears as a positive signal on a binary "1" output of the register. Since a positive potential is present on the reset line R, the negative signal applied by the register strobe line to the junction of capacitors 246 and 248 is effectively balanced out by the positive signal on the reset line R, and, hence, a negative signal is not applied to the base of transistor 260. Thus, since transistor 258 is reversed biased its collector applies B+ B+potential to the base of transistor 260 and this transistor becomes conductive. Accordingly, the potential on the collector of transistor 260 is essentially at ground potential. At this point, we have now provided a ground potential on the binary "0" output and positive signal on the binary "1" output, which indicative that the interrogated memory bit stored a binary "1" signal. The converse would be true if the interrogated memory bit has stored a binary "0" signal.

Although the invention has been shown in connection with preferred embodiments, it will be readily apparent to those skilled in the art that various changes in form and arrangement of parts may be made to suit requirements without departing form the spirit and scope of the invention as defined by the appended claims.

We claim:

1. In a ceramic memory device having means defining at least one ferroelectric storage capacitor memory bit having first and second oppositely facing surfaces and having means for polarizing the capacitor memory bit in one of two stable states by application of an electric field between said surfaces and to develop, when subjected to mechanical stress, a direct current output voltage between said surfaces of a polarity indicative of its state of polarization; the improvement for detecting whether a said output voltage is representative of a first or second said stable state and comprising:

an electrically conductive bit line with means for connecting the bit line in electrical contact with the first surface of a said memory bit;

an electrically conductive common line with means for connecting the common line in electrical contact with the second surface of a said memory bit and having means for connecting the common line to a reference potential;

normally conductive amplifier means for normally providing a first signal of a first value, said amplifier means being coupled to said bit line and serving to respectively increase and decrease the value of said first signal when said output voltage between storage capacitor memory bit surfaces is respectively positive and negative with respect to said reference potential; and, signal level detector means coupled to said amplifier means and having first and second outputs and being responsive to said first signal for energizing said first or second outputs in accordance with whether the value of said first signal is above or below a predetermined value.

2. The improvement as set forth in claim 1 including actuatable switching means electrically interposed between said amplifier means and said detector means for normally rendering said detector means nonresponsive to said first signal.

3. The improvement as set forth in claim 2 including actuatable bistable circuit means defining a register having first and second inputs respectively coupled to the first and second outputs of said level detector means, said register having a binary "1" signal output and a binary "" signal output which are respectively energized in response to energization of said first and second signal level detector outputs.

4. The improvement as set forth in claim 3 including common means for concurrently actuating said actuatable switching means and said bistable circuit means so that the binary outputs of said register may be energized to indicate the stable state of said memory bit.

5. The improvement as set forth in claim 1 including comparator means electrically interposed between said bit line and said amplifier means, said comparator means having a first input coupled to said bit line and second input with means for coupling it to said reference potential and an output circuit said output circuit serving to carry a voltage signal of a value representative of the difference between that on said bit line and that of said reference potential, whereby said voltage signal is representative of said direct current output voltage developed between the surfaces of said memory bit.